United States Patent [19]

Dillard

[11] 4,398,197
[45] Aug. 9, 1983

[54] DIGITAL SIDELOBE CANCELLER WITH REAL WEIGHTS

[75] Inventor: George M. Dillard, San Diego, Calif.

[73] Assignee: The United States of America as represented by the Secretary of the Navy, Washington, D.C.

[21] Appl. No.: 301,088

[22] Filed: Sep. 11, 1981

[51] Int. Cl.³ .............................................. H04B 7/00
[52] U.S. Cl. ............................................. 343/100 LE
[58] Field of Search ................. 343/100 LE, 100 CL; 5/451

[56] References Cited

U.S. PATENT DOCUMENTS 4,119,962 10/1978 Lewis ........................... 343/100 LE
4,222,051 9/1980 Kretschmer et al. ......... 343/100 LE Primary Examiner—Theodore M. Blum Attorney, Agent, or Firm—Robert F. Beers; Ervin F. Johnston; Harvey Fendelman

[57] ABSTRACT

The present invention is digital open-loop sidelobe canceller for decorrelating signals by removing correlated components. The invention has inputs for receiving n pairs of digital sample values representing the digitized in-phase components and quadrature-phase components of the output of the main radar receiver and also of at least one auxiliary radar receiver. These data samples are stored in memory for later processing and are also furnished to computation networks which calculate weighting coefficients which are processed as real numbers. These real number weighting coefficients are utilized to subtract calculated real number values from the sample values representing the digitized in-phase and quadrature-phase components of the output of the main radar receiver.

7 Claims, 3 Drawing Figures ay channel signal power. It uses digital circuits which do not have the drift problems present in analog cancellers. The present invention optimizes sidelobe cancellation and is independent of the lack of orthogonality between the baseband components of the inputs. Instead of utilizing the usual single complex weight utilized in conventional digital open-loop cancellers, the present invention uses real weights to produce weighted sums which are subtrated from the baseband components of the main radar receiver.

DIGITAL SIDELOBE CANCELLER WITH REAL WEIGHTS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates generally to the field of cancellers for use in sidelobe canceller systems that decorrelate signals by removing correlated components. More specifically, the invention relates to digital open-loop cancellers.

In radar and communication systems, undesired interfering signals can be received via antenna sidelobes. These signals, if powerful enough, can significantly degrade performance. The effect of these interfering signals can be reduced or negated by employing the technique known as coherent sidelobe cancellation (CSLC). A CSLC system utilizes one or more auxiliary antennas and receiving systems, hereafter referred to as auxiliaries. By appropriately weighting and summing the signals received from the auxiliaries and subtracting the sum from the signals received via the radar or communication antenna, hereafter referred to as the main antenna, the interfering signals can in general be cancelled. Typically, these prior art CSLC systems use complex number weighting values in order to achieve sidelobe cancellation. The earliest form of a CSLC system was implemented as an analog closed-loop canceller, as described in U.S. Pat. No. 3,202,990 to Paul W. Howells. This canceller has several disadvantages. The loop gain and effective bandwidth are proportional to auxiliary signal level, the loop gain must be limited to avoid oscillation or instability, and imperfect multipliers permit interference feed through from the auxiliary to radar channels. Several improvements and modifications of the original Howells CSLC have been described, e.g. U.S. Pat. Nos. 3,916,408 to Evans, et al., 3,938,153 to Lewis, et al., and 4,044,359 to Applebaum, et al. The Howells canceller loop has been implemented in digital form as described in the patent to Lewis referred to above but still has the disadvantage that it is a closed loop dependent on auxiliary signal power and loop gain.

A digital open-loop CSLC which does not have the disadvantage of the closed-loop analog system is described in U.S. Pat. No. 4,086,592 to Lewis, et al. This canceller is independent of loop gain and auxiliary signal power and uses digital circuits which do not have drift problems as due auxiliary circuits. Cancellation is performed by first converting the input signals in the main and auxiliary channels to baseband components, digitizing these components, and then treating the digitized baseband components as complex numbers. This canceller has the disadvantage that, because of equipment inaccuracies, the baseband components from each channel do not necessarily represent the true in-phase and quadrature-phase components of the input signals. Thus, the complex representation of the baseband signals results in suboptimal performance.

SUMMARY OF THE INVENTION

The present invention is a digital open-loop sidelobe canceller which is independent of loop gain and auxiliary channel signal power. It uses digital circuits which do not have the drift problems present in analog cancellers. The present invention optimizes sidelobe cancellation and is independent of the lack of orthogonality between the baseband components of the inputs. Instead of utilizing the usual single complex weight utilized in conventional digital open-loop cancellers, the present invention uses real weights to produce weighted sums which are subtrated from the baseband components of the main radar receiver.

In accordance with the present invention, the main and auxiliary receivers' baseband components are digitized in in analog-to-digital converters and the inputs to the digital open-loop canceller of the present invention are these digitized baseband components. The baseband components can be obtained, for example, as described in Nathanson, *Radar Design Principals*, McGraw Hill, New York, 1969, page 472. Instead of treating these baseband components as complex numbers of the form $(I+iQ)$, the present invention treats them as pairs of real numbers of the form $(I, Q)$.

A sequence of n pairs $(I_{m1}, Q_{m1})$, $((I_{m2}, Q_{m2})$, ..., $(I_{mn}, Q_{mn})$ of baseband components from the main channel and n pairs $(I_{11}, Q_{11})$, $(I_{12}, Q_{12})$, ..., $(I_{1n}, Q_{1n})$ from the auxiliary channel are used to compute four real weights $W_1$, $W_2$, $V_1$, and $V_2$. The output from the canceller is the sequence of pairs $(R_1 S_1)$, $(R_2, S_2)$, ..., $(R_n, S_n)$ where $R_k = I_{mk} - (W_1 I_{1k} + W_2 Q_{1k})$ and $S_k = Q_{mk} - (V_1 I_{1k} + V_2 Q_{1k})$. The weights are computed so that the sums $R_1^2 + R_2^2 + \ldots + R_n^2$ and $S_1^2 + S_2^2 + \ldots + S_n^2$ are minimized.

The novel aspect of this invention is the conversion of the main and auxiliary signals into baseband components that are treated as real numbers (instead of complex numbers). Optimum real weights $W_1$, $W_2$, $V_1$, and $V_2$ are derived from the input signal samples. This method of weight determination provides optimum cancellation which is independent of auxiliary signal power, and is independent of errors in quadrature of the baseband components.

The present invention has the following advantages as compared with the invention described in U.S. Pat. No. 4,086,592 to Lewis, et al. In Lewis, the invention described therein considers the inputs from the main and auxiliary channels as complex numbers of the form $I_m + iQ_m$ and $I_1 + iQ_1$. The complex weight $W = E + iF$ is computed and the canceller output is $$I_m + iQ_m - (E + iF)(I_l + iQ_l) = \quad (1)$$

$$I_m - (EI_l - FQ_l) + i(Q_m - (EQ_l + FI_l)).$$

If the real and imaginary parts of the output given in equation (1) are compared above with the outputs produced by the present invention to be described, it is seen that equation (1) is more restrictive. That is, only two real weights E and F are used in (1), while the present invention shows that at least four real weights $W_1$, $W_2$, $V_1$, and $V_2$ are used. It can be shown that there are many practical situations where the real-weight canceller of the present invention will have considerable improved performance compared with the performance of the system described by equation (1). For example, assuming that $I_1 = BI_m$ and $Q_1 = CQ_m$, with both B and C greater then zero and $B \neq C$, then there is no complex weight such that equation (1) could provide an output of zero, i.e. perfect cancellation is not achievable. However, for the real-weight canceller of the present invention, $W_1=1/B$, $W_2=0$, $V_1=0$, $V_2=1/C$ provides a zero output.

OBJECTS OF THE PRESENT INVENTION

Accordingly, it is the primary object of the present invention to disclose a novel digital sidelobe canceller that utilizes real weights instead of complex number weighting values.

It is a further object of the present invention to disclose a digital sidelobe canceller that is more accurate and efficient than prior art sidelobe cancellers.

It is a further object of the present invention to disclose a digital sidelobe canceller that is capable of sidelobe cancellation even in the situation where the baseband components from the radar output are "out of quadrature". In other words, the digital sidelobe canceller of the present invention is tolerant of lack of quadrature between the so-called in-phase and quadrature-phase components of the output of the radar receivers.

Other objects and many of the attendant advantages of this invention will be readily appreciated as the same becomes better understood by reference to the following detailed description when considered in connection with the accompanying drawings.

BRIEF DESCRIPTION OF THE PREFERRED EMBODIMENTS

Figure 1:
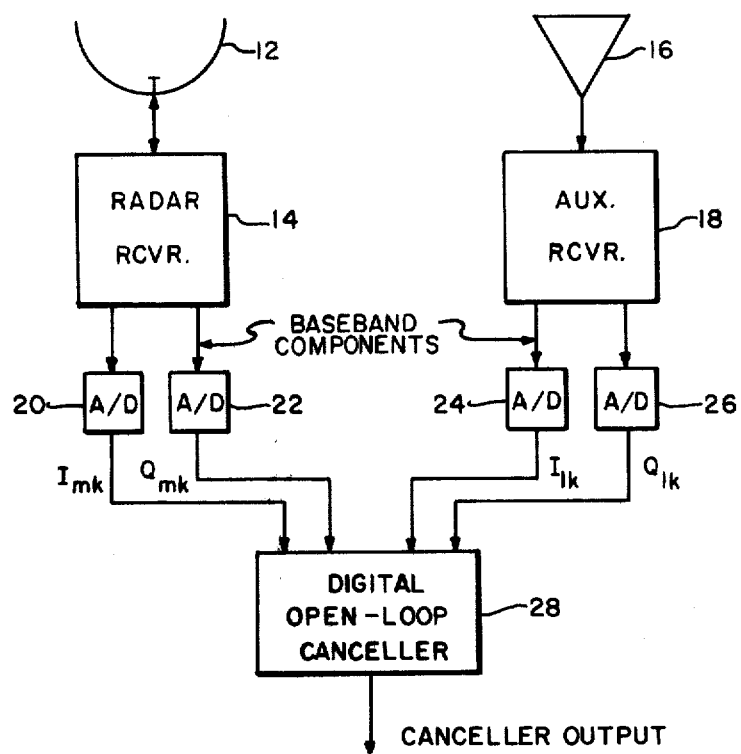
FIG. 1 is a schematic block diagram illustrating the digital open-loop canceller of the present invention in conjunction with the outputs of a radar main receiver channel and a radar auxiliary receiver channel.
Figure 2:
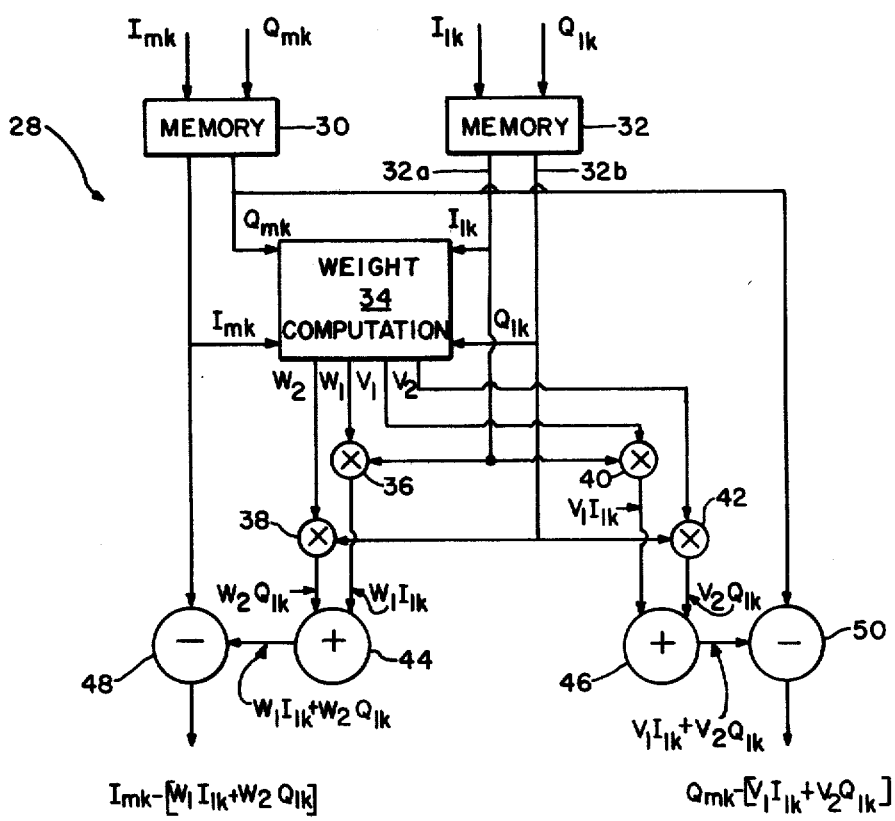
FIG. 2 is a schematic block diagram of the digital sidelobe canceller of the present invention.
Figure 3:
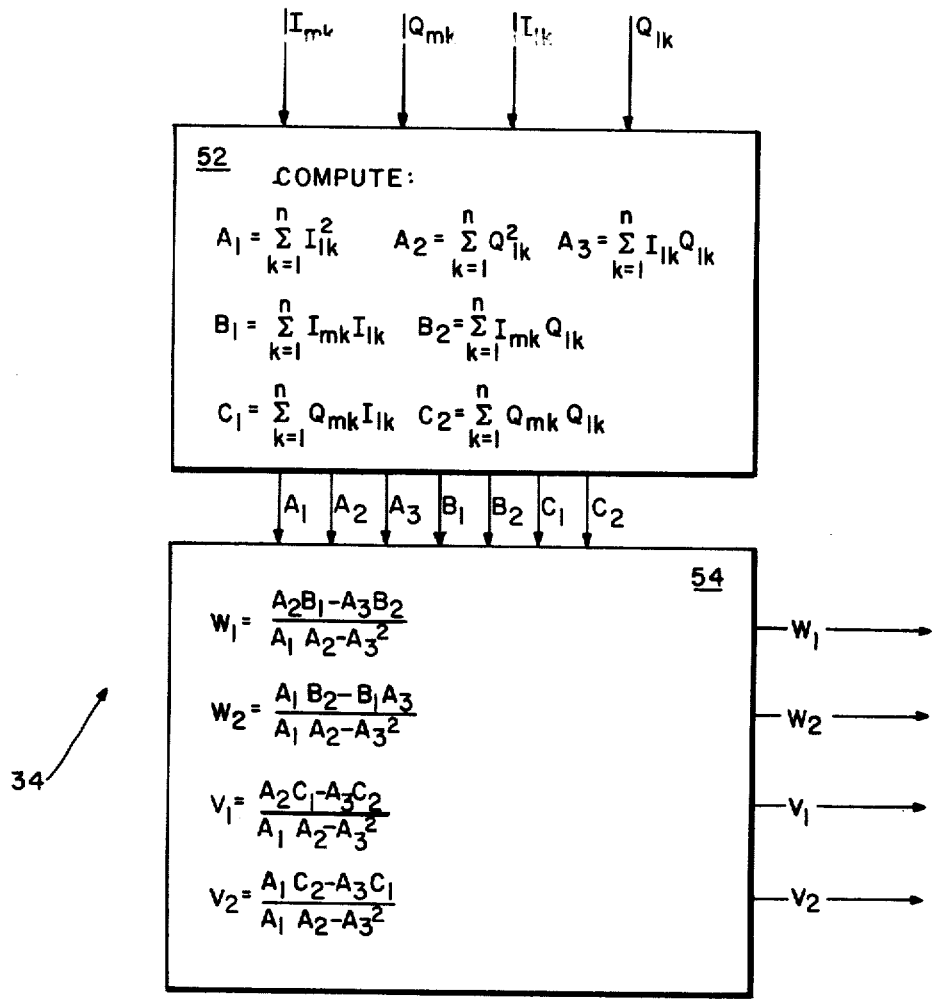
FIG. 3 is a schematic block diagram of the weight computation network of the present invention.

Referring now to FIGS. 1 through 3 the present invention will be described.

A simplified block diagram of the main radar and auxiliary radar receiving systems is illustrated in FIG. 1. A main radar receiving antenna 12 is connected to main radar receiver 14. Similarly, an auxiliary radar antenna 16 is connected to the auxiliary receiver 18. The outputs of main radar receiver 14 and auxiliary radar receiver 18 are the baseband radar components also known as the in-phase and quadrature-phase components. It is noted at this point that the terms in-phase and quadrature-phase components theoretically indicate that there is a true quadrature relationship between the two outputs of each radar receiver. In fact and in practice, however, it is known that, due to imperfections in system components such as inequalities in component gains, the so-called in-phase and quadrature phase outputs of the radar receivers may not necessarily be in true quadrature relationship. For purposes of this disclosure, however, it is to be understood that the phrases in-phase and quadrature-phase components are intended to be synonymous with the phrase baseband components and are intended to refer to the component signals understood to be present on the main and auxiliary radar receiver output channels referred to as the in-phase and quadrature-phase channels.

The radar and auxiliary receiver in-phase and quadrature-phase components are digitized in the analog-to-digital converters 20, 22, 24 and 26 as illustrated in FIG. 1 and these digitized baseband components are the inputs to the digital open-loop canceller 28 of the present invention.

Referring now to FIG. 2 there is illustrated a simplified block diagram of the real-weight digital open-loop coherent sidelobe canceller 28 of the present invention. Blocks of n pairs of baseband data from both the main and auxiliary radar in-phase and quadrature-phase channels are input into memories 30 and 32 for later processing. The memories 32 may be delay networks or random access memories as would be readily understood by those skilled in this art. The blocks of data stored in memories 30 and 32 are also furnished at their outputs and provided as the inputs to the weight computation network 34. The weight computation network 34 computes the real number weighting values $W_1$, $W_2$, $V_1$ and $V_2$. Computation of these weighting values is described further below with respect to FIG. 3. These weights which are the outputs of the weighting network 34 are used to obtain two weighted sums of the data pairs from the auxiliary radar in-phase and quadrature-phase channels. In computing these weighted sums, the weights applied to each element of each pair are, in general, different. Weight $W_1$ is applied to the output 32a of memory 32, i.e. to the sample values $I_{1k}$. This is accomplished in multiplier network 36, the output of which is a signal representing the values $W_1 I_{1k}$ as is illustrated. Similarly, the weight value $W_2$ is applied to the $Q_{1k}$ output channel 32b via multiplier 36, the output of which is a signal representing the values $W_2 Q_{1k}$. Similarly, multipliers 40 and 42 apply the weighting values $V_1$ and $V_2$, respectively, to the sample values on outputs 32a and 32b, respectively, of memory 32. The outputs of multipliers 40 and 42 thus are signals representing the values $V_1 I_{1k}$ and $V_2 Q_{1k}$, respectively.

A first adder network 44 receives its inputs from the outputs of multiplier networks 36 and 38 such that output of adder 44 is a signal representing the quantity $W_1 I_{1k} + W_2 Q_{1k}$. Likewise, the outputs of multipliers 40 and 42 are applied to the inputs of adder 46 which sums its inputs to provide an output signal representing the quantity $V_1 I_{1k} + V_2 Q_{1k}$. The output signal from adder 44 is provided as a first input to subtractor 48. Subtractor 48 receives its other input from the memory 30 to generate an output signal representing the quantity $I_{mk} - [W_1 I_{1k} + W_2 Q_{1k}]$. Likewise, subtractor network 50 receives one of its inputs from the output of adder 46. Subtractor network 50 subtracts the output of adder network 46 from the signals appearing on the output of memory 30b, namely, the so-called quadrature-phase component of the main radar receiver. Subtractor network 50 thereby provides an output signal representing the quantity $Q_{mk} - [V_1 I_{1k} + V_2 Q_{1k}]$.

The weight computation network 34 illustrated in FIG. 2 is shown in more detail in FIG. 3. Weight computation network 34 is comprised of a first multiplier-accumulator network 52 which receives the input signals representing the quantities $I_{mk}$, $Q_{mk}$, $I_{1k}$ and $Q_{1k}$ as illustrated. A second multiplier-accumulator network 54 receives as its input output signals from multiplier-accumulator network 54 which are signals representing the quantities $A_1$, $A_2$, $A_3$, $B_1$, $B_2$, $C_1$ and $C_2$. Each of the multiplier-accumulator networks 52 and 54 may be comprised of either a single multiplier-accumulator that is time-shared or it may comprise an array of multiplier-accumulators as would be readily understood by those who are skilled in the art. The output signal representing the quantity $A_1$ of multiplier-accumulator 52 is computed by forming the sum of the squares of each of the data samples $I_{1k}$, for $k=1$ to n as is indicated by the mathematical expression $$A_1 = \sum_{k=1}^{n} I_{1k}^2.$$

Similarly, the multiplier-accumulator network 52 generates an output signal representing the value $A_2$ where $$A_2 = \sum_{k=1}^{n} Q_{1k}^2.$$

Likewise, the multiplier-accumulator 52 generates output signals representing the values $A_3$, $V_1$, $V_2$, $C_1$ and $C_2$ which values are defined as follows:

$$A_3 = \sum_{k=1}^{n} I_{1k}Q_{1k}, B_1 = \sum_{k=1}^{n} I_{mk}I_{1k}, B_2 = \sum_{k=1}^{n} I_{mk}Q_{1k},$$

$$C_1 = \sum_{k=1}^{n} Q_{mk}I_{1k}, C_2 = \sum_{k=1}^{n} Q_{mk}Q_{1k}.$$

The signals representing the values $A_1$, $A_2$, $A_3$, $B_1$, $B_2$, $C_1$ and $C_2$ are utilized by the multiplier-accumulator 54 to generate signals representing the real number weighting values $W_1$, $W_2$, $V_1$ and $V_2$. These real number weighting values are defined mathematically as follows:

$$W_1 = \frac{A_2B_1 - A_3B_2}{A_1A_2 - A_3^2}, W_2 = \frac{A_1B_2 - B_1A_3}{A_1A_2 - A_3^2},$$

$$V_1 = \frac{A_2C_1 - A_3C_2}{A_1A_2 - A_3^2}, \text{ and } V_2 = \frac{A_1C_2 - A_3C_1}{A_1A_2 - A_3^2}.$$

It is noted at this point that the present invention has been described with respect to its system that has only one auxiliary radar receiver. It is to be understood, however, that the present invention is equally applicable to radar systems employing more than one auxiliary radar receiver. It is also to be understood that although particular computing networks have been described above, e.g. a multiplier-accumulator, other types of computing networks could be utilized within the scope of the present invention. Specifically, it is considered within the scope of the present invention that the weight computation network 34 of the present invention could be implemented as a dedicated microprocessor. As an alternate embodiment, it is also considered within the scope of the present invention that the weight computation network could be implemented with a Gram-Schmidt orthogonalization preprocessor.

Obviously, many other modifications and variations of the present invention are possible in the light of the above teachings. It is therefore to be understood that within the scope of the appended claims the invention may be practiced otherwise than as specifically described.

I claim:

1. A real-weight digital open-loop coherent sidelobe canceller for a radar system having a main radar receiver and at least one auxiliary radar receiver comprising:
   a first memory having first and second inputs for receiving signals representing a sequence of n pairs of digital sample values, $I_{mk}$ and $Q_{mk}$, the sample values $I_{mk}$ and $Q_{mk}$ representing, respectively, the digitized in-phase components and quadrature phase components of the output of the main radar receiver;
   a second memory having third and fourth inputs for receiving signals representing a sequence of n pairs of digital sample values $I_{1k}$ and $Q_{1k}$, the sample values $I_{1k}$ and $Q_{1k}$ representing, respectively, the digitized in-phase components and quadrature phase components of the output of said auxiliary radar receiver;
   computing means connected to said first and second memories for forming signals representing the weighting coefficients $W_1$, $W_2$, $V_1$ and $V_2$;
   a first multiplier means connected to said computing means and to said second memory for forming signals representing the products $W_1I_{1k}$;
   a second multiplier means connected to said computing means and to said second memory for forming signals representing the products $W_2Q_{1k}$;
   a third multiplier means connected to said computing means and to said second memory for forming signals representing the products $V_1I_{1k}$;
   a fourth multiplier means connected to said computing means and to said second memory for forming signals the representing the products $V_2Q_{1k}$; and
   output means connected to said first memory and to said first, second, third and fourth multiplier means for forming a first signal set, $I_{mk} - [W_1I_{1k} + W_2Q_{1k}]$, and a second signal set $Q_{mk} - [V_1I_{1k} + V_2Q_{1k}]$ said first and second signal sets representing, respectively, sidelobe cancelled in-phase channel signals and sidelobe cancelled quadrature phase signals.

2. The sidelobe canceller of claim 1 wherein: said first and second memories are random access memories.

3. The sidelobe canceller of claims 1 or 2 wherein said computing means comprises:
   a first multiplier-accumulator; and
   a second multiplier-accumulator connected to the output of said first multiplier-accumulator.

4. The sidelobe canceller of claim 3 wherein:
   said first multiplier-accumulator forms signals representing the values $A_1$, $A_2$, $A_3$, $B_1$, $B_2$, $C_1$, and $C_2$ where $$A_1 = \sum_{k=1}^{n} I_{1k}^2, A_2 = \sum_{k=1}^{n} Q_{1k}^2, A_3 = \sum_{k=1}^{n} I_{1k}Q_{1k},$$

$$B_1 = \sum_{k=1}^{n} I_{mk}I_{1k}, B_2 = \sum_{k=1}^{n} I_{mk}Q_{1k},$$

$$C_1 = \sum_{k=1}^{n} Q_{mk}I_{1k}, C_2 = \sum_{k=1}^{n} Q_{mk}Q_{1k}, \text{ and}$$

wherein said second multiplier-accumulator forms signals representing said weighting coefficients $W_1$, $W_2$, $V_1$, and $V_2$ wherein $$W_1 = \frac{A_2B_1 - A_3B_2}{A_1A_2 - A_3^2}, W_2 = \frac{A_1B_2 - B_1A_3}{A_1A_2 - A_3^2},$$

$$V_1 = \frac{A_2C_1 - A_3C_2}{A_1A_2 - A_3^2}, \text{ and } V_2 = \frac{A_1C_2 - A_3C_1}{A_1A_2 - A_3^2}.$$

5. The sidelobe canceller of claims 1 or 2 wherein said output means comprises:

a first adder having inputs connected to said first and second multipliers;

a second adder connected to said third and fourth multipliers;

a first substractor connected to said first adder and to said first memory; and a second subtractor connected to said second adder and to said first memory.

6. The sidelobe canceller of claim 3 wherein said output means comprises:

a first adder having inputs connected to said first and second multipliers;

a second adder connected to said third and fourth multipliers;

a first substractor connected to said first adder and to said first memory; and a second subtractor connected to said second adder and to said first memory.

7. A real-weight digital open-loop coherent sidelobe canceller for a radar system having a main radar receiver and at least one auxiliary radar receiver comprising:

memory means having a first input for receiving a first series of digital signals representing the in-phase channel components of the output of said main radar receiver and having a second input for receiving a second series of digital signals representing the quadrature phase channel components of the output of said main radar receiver, said memory means having first and second outputs, said memory means providing said first and second series of digital signals on said first and second outputs, respectively; and means connected to said at least one auxiliary receiver and to said memory means first and second outputs for subtracting from each of said first series of digital signals a signal representing one of a first series of real number weighted values and for subtracting from each of said second series of digital signals one of a second series of real number weighted values.

* * * * *